United States Patent [19]

Lari

[11] 4,002,359
[45] Jan. 11, 1977

[54] TOOL JOINT FOR DRILL PIPES

[75] Inventor: Ion Lari, Cimpina, Romania

[73] Assignee: Institutul De Cercetari Si Proiectari De Petrol Si Gaze, Cimpina, Romania

[22] Filed: Oct. 29, 1975

[21] Appl. No.: 626,870

[30] Foreign Application Priority Data

Aug. 16, 1974 Romania .............................. 79803

[52] U.S. Cl. .............................. 285/331; 285/333
[51] Int. Cl.² .......................................... F16L 25/00
[58] Field of Search .......... 285/333, 334, 331, 390, 285/355, 114, 115, 116, 371, 398

[56] References Cited

UNITED STATES PATENTS

| | | | |
|---|---|---|---|
| 1,449,773 | 3/1923 | Miller | 285/115 |
| 1,839,676 | 1/1932 | Hicks | 285/390 X |
| 3,186,738 | 6/1965 | Dalrymple | 285/333 X |
| 3,188,123 | 6/1965 | Hansen | 285/334 X |

*Primary Examiner*—Dave W. Arola
*Attorney, Agent, or Firm*—Karl F. Ross; Herbert Dubno

[57] ABSTRACT

The invention relates to a tool joint for drill pipes.

According to the invention the tool joint consists of a threaded sleeve having an internal cylindrical recess, a pin 2 is threaded into the sleeve and has an internal cylindrical recess b, in which a convergent-divergent nipple 3 is pressure fitted, said nipple resisting the bending moments arising in the threaded joint and in the two critical zones of the drill pipe. The nipple permits self-balancing of said bending moments and the reduction and equalization of their values across each contact face of the nipple ends.

1 Claim, 2 Drawing Figures

TOOL JOINT FOR DRILL PIPES

The invention refers to a joint for a drill string. It is well known that the joints used presently, with threaded pin and box, pressure welded to the drill pipe, allow variable stress conditions to arise in the pin and box system, resulting in fatigue, pin failures and drill pipe failure at the critical point (the transition from upset ends to the pipe body).

The present invention eliminates these disadvantages by using a tool joint which removes the variable bending moments induced in the pin-and-box system, under the influence of external loads, and associated strain phenomena, reduces the bending moments in the critical zones and increases the tensile load bearing strength. The tool joint consists of an internally threaded box having cylindrical internal recess in the unthreaded zone, an externally threaded pin also having an internal cylindrical recess, and a convergent-divergent nipple pressure fitted in the recesses, the nipple resisting the bending moments occurring in the pin-and-box thread and in the critical zones, at the same time permitting self-balancing of these moments, reducing and equalizing their values across the contact faces at the nipple ends.

Figure 2:
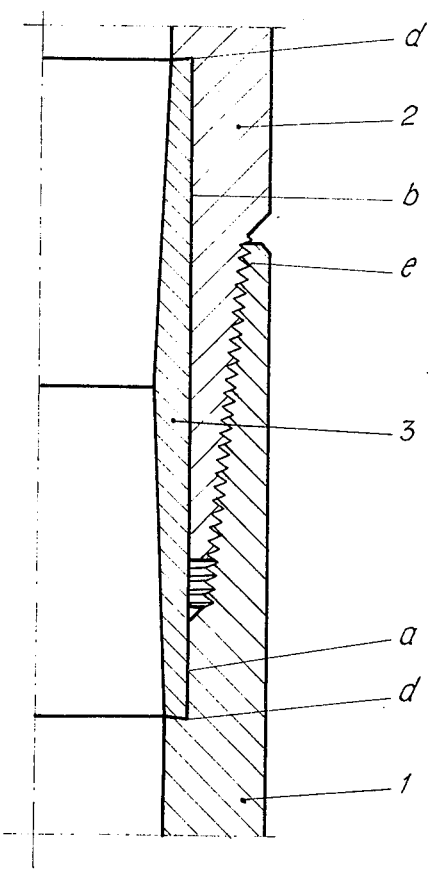
Figure 1:
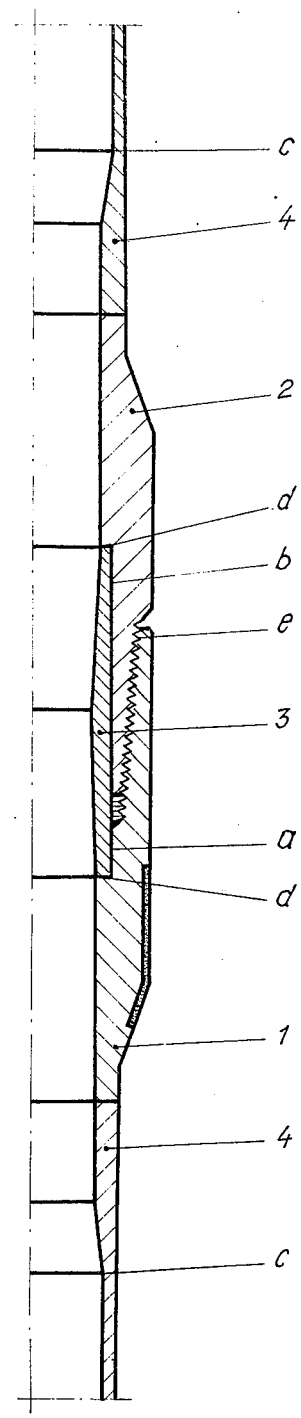

An example of the invention is described below and illustrated in the accompanying drawing in which FIGS. 1 and 2 are views showing a longitudinal cross section of the joint.

According to the present invention the tool joint consists of the internally threaded box 1, said box having an internal cylindrical recess $a$, a pin 2 also having an internal cylindrical recess $b$, in which a convergent-divergent nipple 3 is pressure fitted, the nipple resisting the bending moments arising in the pin-and-box thread and in the two critical zones $c$ of the drill pipe 4. The nipple 3 permits self-balancing of said bending moments, the reduction and equalization of their values across each contact face of the nipple ends $d$.

The particularly sensitive zones $c$ of the drill pipe 4 are, as can be seen from the drawing, the regions immediately behind the thickened or upset portions to which the box 1 and the pin 2 are affixed.

As is also apparent from FIGS. 1 and 2, the threaded connection between the box 1 and the pin 2 is a conventional tapered thread and below the internal thread, the box 1 is formed with a recess $a$. The recess $b$ of the pin 2 can extend beyond the length of its external thread.

The nipple 3 is termed a convergent-divergent nipple because its interior initially converges from its upper end face, at which it is flush with the interior of the pin 2, to a central region and then diverges to its lower-end face $d$ to which it is flush with the interior of the box 1. The tool joint according to the present invention has the following advantages over the existing drill pipe joints:

- it eliminates the variable bending moments arising in the pin-and-box thread under the influence of the external loads, and the resulting strain,
- it reduces bending moments by about 30% in the critical zones of the drill pipes, where failures are most likely to occur,
- it increases the tensile load bearing strength of the thread in that the thread length is increased within the same API range.

All these advantages result in the reduction of drill pipe failures, which are known to be expensive to solve.

I claim:

1. A joint for a pair of pipes of a drill string, comprising:
   a cylindrical box fixed to one of said pipes and formed with an internal tapered thread and with a cylindrical recess beyond said thread said recess terminating in a shoulder formed in said box;
   a cylindrical pin fixed to the other pipe and having a tapered external thread screwed into the internal thread of said box, said pin being formed with an inner cylindrical recess said recess terminating in a shoulder formed in said pin;
   a nipple having a smooth cylindrical outer surface snugly received within said recesses and having end faces engaged by said shoulders, said nipple having an interior which converges from one of said end faces toward a central region of the nipple and diverges from said central region to said other end face.

* * * * *